United States Patent
Hong et al.

(10) Patent No.: US 7,185,350 B2
(45) Date of Patent: Feb. 27, 2007

(54) DISK DRIVE ADOPTING VIBRATION ABSORBER

(75) Inventors: Soon-kyo Hong, Seoul (KR); Young-won Lee, Gyeonggi-do (KR); Hong-ryul Kim, Seoul (KR); Suk-il Oh, Gyeonggi-do (KR); Jin-tai Chung, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/462,601

(22) Filed: Jun. 17, 2003

(65) Prior Publication Data

US 2003/0231575 A1     Dec. 18, 2003

(30) Foreign Application Priority Data

Jun. 18, 2002    (KR) ............................... 2002-34136

(51) Int. Cl.
*G11B 17/02* (2006.01)
(52) U.S. Cl. ...................................... 720/698
(58) Field of Classification Search ............... 720/698, 720/701, 702, 603; 369/247, 264
See application file for complete search history.

(56) References Cited

U.S. PATENT DOCUMENTS

| | | | |
|---|---|---|---|
| 6,577,577 B2 * | 6/2003 | Watanabe et al. ........... | 720/603 |
| 6,834,393 B2 * | 12/2004 | Akimaru et al. ............ | 720/698 |
| 2001/0002897 A1 * | 6/2001 | Huang et al. ............... | 369/247 |
| 2002/0150026 A1 * | 10/2002 | Mahr et al. ................. | 369/264 |

FOREIGN PATENT DOCUMENTS

| | | | |
|---|---|---|---|
| JP | 10-11956 | | 1/1998 |
| JP | 10011956 A | * | 1/1998 |
| JP | 10233086 A | * | 9/1998 |
| JP | 11-3582 | | 1/1999 |
| JP | 2000-090654 | | 3/2000 |
| JP | 2001-101779 | | 4/2001 |
| JP | 2001355670 A | * | 12/2001 |
| KR | 2000-19481 | | 4/2000 |
| WO | WO 01/65560 | | 9/2001 |
| WO | WO01/65560 A1 | * | 9/2001 |

OTHER PUBLICATIONS

Korean Office Action mailed Nov. 17, 2004, with English translation.

* cited by examiner

*Primary Examiner*—Tianjie Chen
(74) *Attorney, Agent, or Firm*—Staas & Halsey LLP

(57) ABSTRACT

A disk drive including a spindle motor rotating a disk, a pickup unit accessing the disk, a frame where the spindle motor is installed, and a vibration absorber installed on the frame to absorb vibrations due to rotation of the disk, that vibrates in a direction in which an exciting force is offset in horizontal and vertical directions with respect to the frame. Thus, as the vibration absorber vibrates in response to vibration of the frame, in a direction to offset the vibration if the frame, the vibration of the frame can be reduced.

14 Claims, 8 Drawing Sheets

DISK DRIVE ADOPTING VIBRATION ABSORBER

CROSS-REFERENCE TO RELATED APPLICATIONS

This application claims the priority of Korean Patent Application No. 2002-34136 filed Jun. 18, 2002 in the Korean Intellectual Property Office, the disclosure of which is incorporated herein in its entirety by reference.

BACKGROUND OF THE INVENTION

1. Field of the Invention

The present invention relates to a disk drive, and more particularly, to a disk drive which can reduce vibration generated by rotation of a disk.

2. Description of the Related Art

In general, disk drives are used to record information on a disk shaped medium, such as a compact disk (CD) or a digital video disk (DVD), or reproduce the information recorded on the medium.

FIG. 1 shows an example of a typical disk drive. As shown in the drawing, a disk drive includes a frame 20 installed in a housing 10, a spindle motor 30 installed on the frame 20 to rotate a disk D, a turntable 40 coupled to a rotation shaft of the spindle motor 30 and on which the disk D is placed, and a pickup unit 50 reciprocating in a radial direction of the rotating disk D to record or reproduce information.

In the disk drive having the above structure, while the disk D is rotated, the pickup unit 50 records information on a recording surface of the disk D or reproduces the information recorded on the recording surface.

Preferably, the disk D used in the disk drive is completely flat and has a uniform mass distribution. However, it is practically impossible to make such a disk, and a general disk has warp and irregular mass distribution as shown in FIG. 2. referring to FIG. 2, a value obtained by multiplying mass m by distance r from the center of the disk D is eccentric mass m', which quantitatively represents irregularity of mass distribution of the disk D. Gram·centimeter (g·cm) is used as a unit for eccentric mass m'.

When the disk D having the eccentric mass m' and warp is placed on the turntable 40 and rotated at a high speed by the spindle motor 30, an exciting force in a horizontal direction proportional to the eccentric mass m' and an exciting force in a vertical direction proportional to the amount of warp are generated, so that the frame 20 is vibrated. Typically, the vibrations are not completely alleviated by buffer members 60 installed at coupling portions P1, P2, P3 where the frame 20 and the housing 10 are coupled.

Recently, to solve the above problem, a disk drive adopting a ball balancer has been suggested, as shown in FIG. 3. The ball balancer includes a circular accommodation portion 70 formed on the turntable 40, and a plurality of balls 80 rotating in the accommodation portion 70. In this structure, when a disk having an eccentric mass m' is placed on the turntable 40 and rotated, the balls 80 are disposed at a position opposite to the eccentric mass m' in the accommodation portion 70, according to the principle of rotor dynamics, to maintain balance in mass, so that vibration generated due to the eccentricity of the disk can be reduced.

The ball balancer can provide a good vibration reduction effect at high disk speeds. But at low speeds, since the balls 80 are gathered toward the eccentric mass m', vibration and noise are increased. With the ball balancer, in general, when information is recorded on a disk, since the disk is driven at low speeds, a recording error may be made due to the effect of the ball balancer.

Also, the ball balancer reduces vibration in the horizontal direction generated due to the eccentric mass m', but has no effect on the vibration in the vertical direction generated due to a disk warp.

When the frame 20 is vibrated by the exciting force in the horizontal and vertical directions generated due to the eccentric mass m' and a warp of the disk D, accurate position control in the vertical and horizontal directions between the disk D and the pickup unit 50 is difficult. Thus, the vibration in the frame 20 prevents a disk from having an increased recording density of a disk, and therefore a large capacity. The vibration also prevents high speed recording and reproduction of the disk.

SUMMARY OF THE INVENTION

To solve the above and/or other problems, the present invention provides a disk drive that can simultaneously reduce vibrations in the frame in the horizontal and vertical directions, that are generated due to an eccentric mass and a disk warp.

According to an aspect of the present invention, a disk drive has a spindle motor rotating a disk, a pickup unit accessing the disk which rotates, a frame where the spindle motor is installed, and a vibration absorber installed on the frame and vibrating in a direction in which an exciting force is offset in horizontal and vertical directions relative to the frame, the exciting force being generated due to rotation of the disk.

According to one aspect, a plurality of vibration absorbers are installed, wherein at least one vibration absorber absorbs vibrations at a first frequency, and at least one other vibration absorber absorbs vibrations at a different frequency.

According to one aspect, the disk drive also has a ball balancer, compensating for eccentric mass of the disk, and provided at a turntable, which is installed on a rotation shaft of the spindle motor, and on which the disk is placed.

According to one aspect, the vibration absorber has a mass body and a connection member, which is elastically deformable and connects the mass body and the frame so that the mass body vibrates in vertical and horizontal directions with respect to the frame.

According to one aspect, the connection member has a plurality of coil springs, arranged at regular intervals around the mass body, that connect the frame and the mass body.

According to one aspect, the connection member is made of a viscoelastic material. According to another aspect, the connection member has an elastic portion with an opening into which the mass body is inserted, and a body that extends outwardly from the elastic portion, and is coupled to the frame.

According to one aspect, the mass body and the connection member are integrally formed. According to another aspect, the connection member has a body portion with an opening fixed to the frame, and an elastic portion disposed in the body portion and connected to the body portion and the frame. According to yet another aspect, the vibration absorber is made of injection molded plastic. According to still yet another aspect, the vibration absorber is made of a rubber material exhibiting viscoelasticity.

According to the above structure, as the vibration absorber vibrates in response to vibration of the frame, in a direction to offset the vibration, the vibration of the frame can be reduced.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments taken in conjunction with the accompanying drawings in which.

DETAILED DESCRIPTION OF THE PREFERRED EMBODIMENTS

Figure 1:
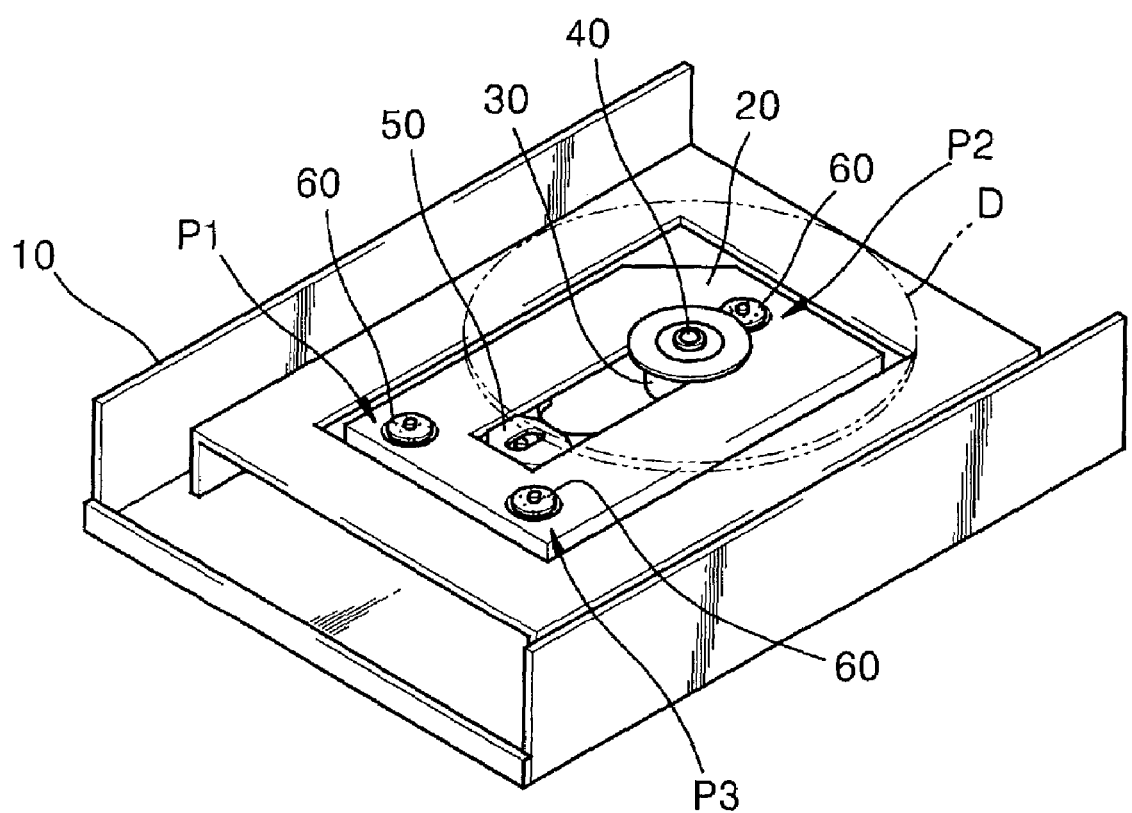
FIG. 1 is a perspective view illustrating an example of a typical disk drive.
Figure 2:
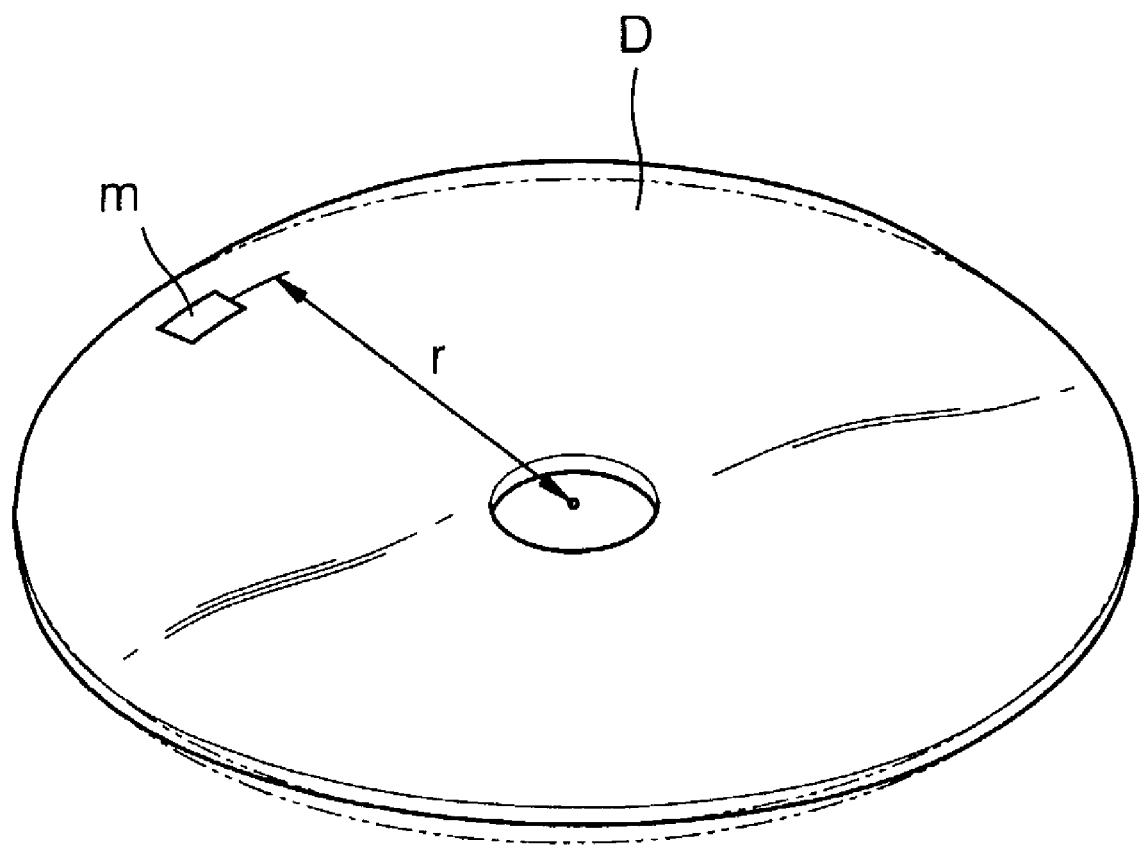
FIG. 2 is a perspective view illustrating the warp and eccentric mass of a disk.

Reference will now be made in detail to embodiments of the present invention, examples of which are illustrated in the accompanying drawings, wherein like reference numerals refer to the like elements throughout. The embodiments are described below to explain the present invention by referring to the figures.

Figure 4:
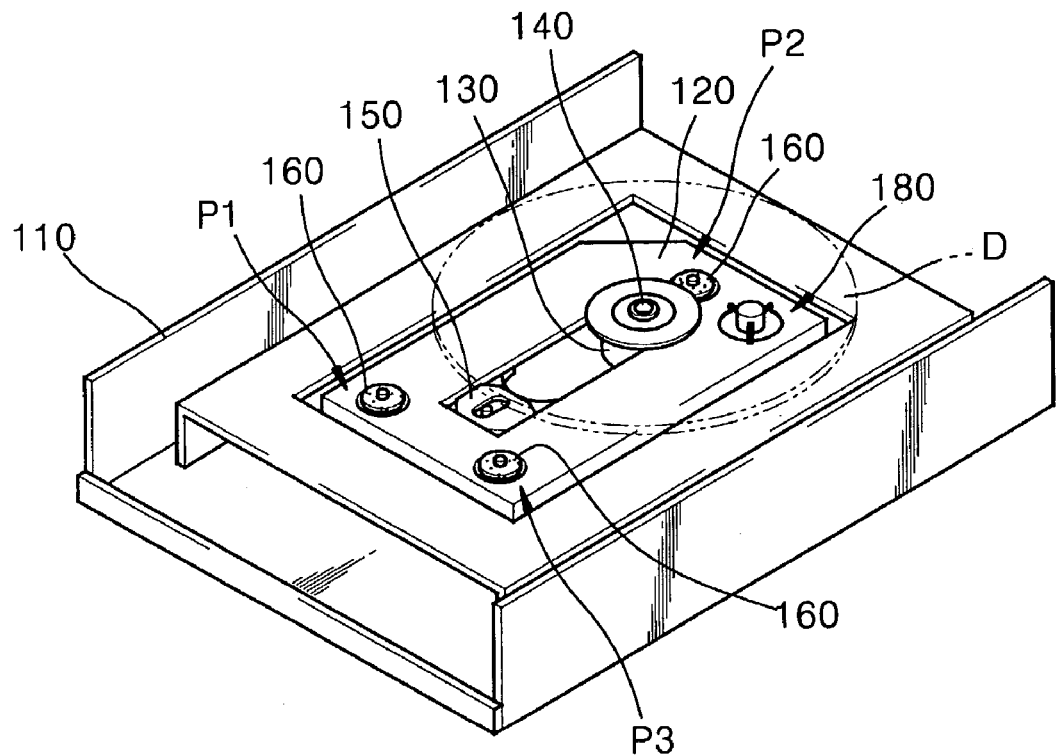
FIG. 4 is a perspective view illustrating a disk drive according to an embodiment of the present invention.

Referring to FIG. 4, a frame 120 is installed on a housing 110. Buffer members 160 exhibiting viscoelasticity, e.g. rubber material, are provided at three coupling portions P1, P2, and P3 where the frame 120 and the housing 110 are coupled, to prevent vibration of the frame 120 from being transferred to the housing 110.

Figure 3:
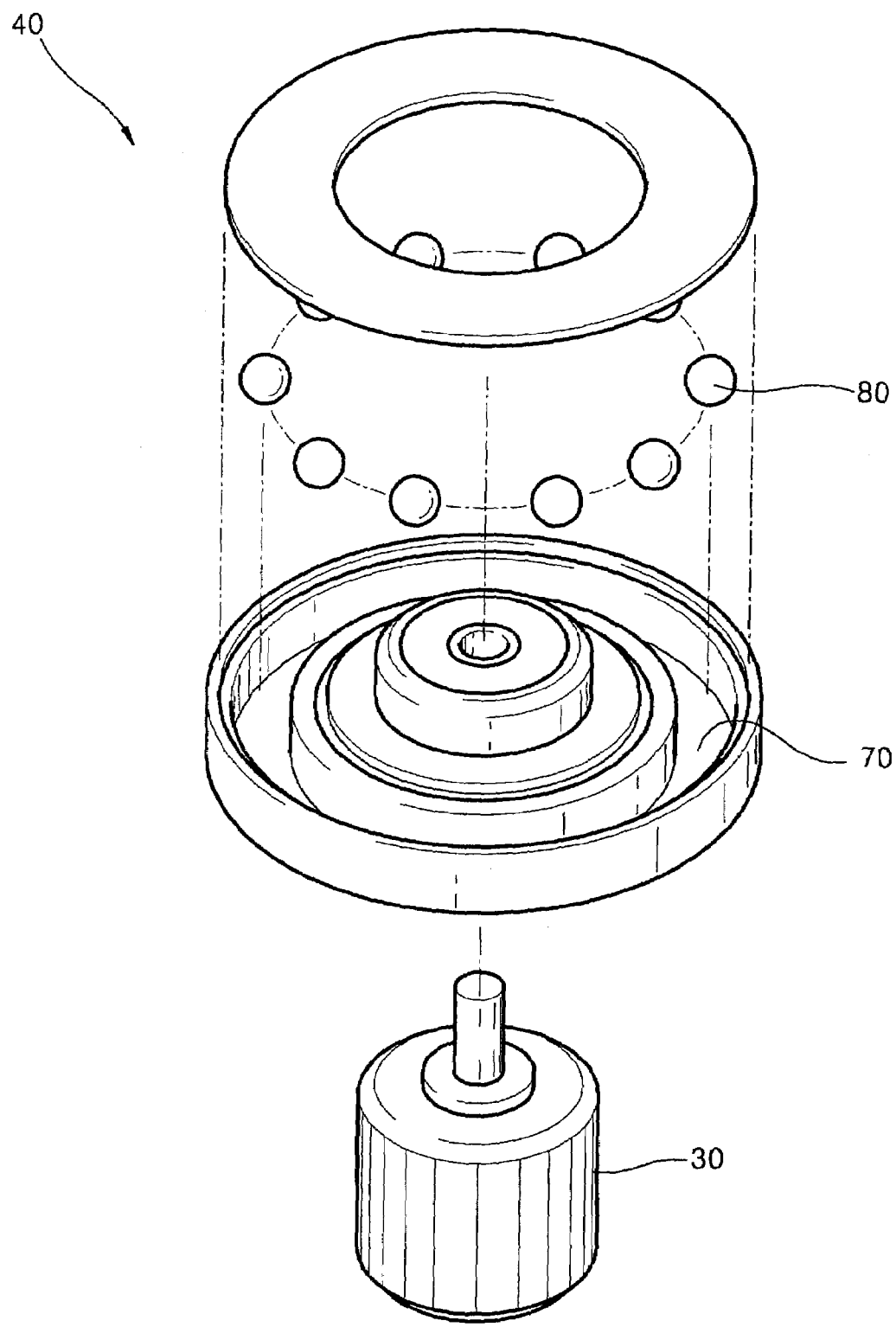
FIG. 3 is a perspective view illustrating a ball balancer.

A spindle motor 130 rotating the disk D, a pickup unit 150 recording information on the disk D or reproducing the information recorded on the disk D while sliding back and forth in a radial direction of the disk D, and a vibration absorber 180 absorbing vibration generated due to the rotation of the disk D, are installed on a frame 120. A turntable 140 on which the disk D is placed is coupled to a rotation shaft of the spindle motor 130. According to one aspect, the ball balancer shown in FIG. 3 is provided in the turntable 140. Additionally, according to one aspect, the pickup unit 150 is coupled to the housing 110.

Figure 5:
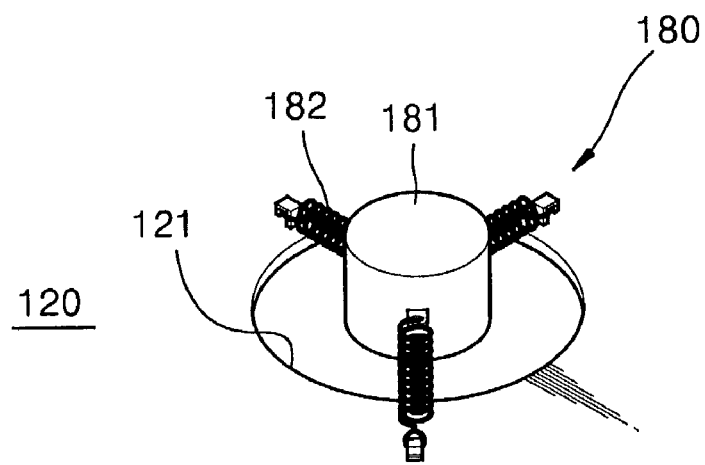
FIG. 5 is a perspective view illustrating the vibration absorber of FIG. 4.

The vibration absorber 180, as shown in FIG. 5, includes a mass body 181 disposed at a penetration portion 121 of the frame 120, and a connection member 182 elastically connecting the mass body 181 and the frame 120. According to one aspect, the connection member 182 is three coil springs 182. The size of the penetration portion 121 is determined by considering an installation space of the coil spring 182 and the outer diameter of the mass body 181, so that the mass body 181 can vibrate in the vertical and horizontal directions. One end of each of the coil springs 182 is coupled to the frame 120 along the outer circumference of the penetration portion 121 and the other end of each of the coil springs 182 is connected to the mass body 181. According to one aspect, locations where the coils springs 182 are coupled to the frame 120 are arrayed at regular intervals around the penetration portion 121. Thus, as the coil springs 182 compress and expand in the vertical and horizontal directions, the mass body 181 elastically vibrates in the vertical and horizontal directions with respect to the frame 120.

According to one aspect, the three coil springs 182 are installed at regular intervals around the mass body 181. According to another aspect, however, the coil springs 182 are not installed at regular intervals around the mass body 181. According to one aspect, at least four coil springs 182 are installed on the mass body 181 and are connected to the frame 120.

According to one aspect, the connection member 182 connecting the mass body 181 and the frame 120 is a single elastic member 182 (not shown) with a clock spring shape, that has an outer circumferential portion connected to the frame 120, and is connected to the mass body 181 at a center portion of the elastic member 182.

The mass M of the mass body 181 and the spring coefficient k of the coil spring 182 are determined corresponding to the frequency of vibration to be removed. Optimally, the vibration frequency to be absorbed by the vibration absorber 180 is proportional to a square root of k/M.

Figure 6:
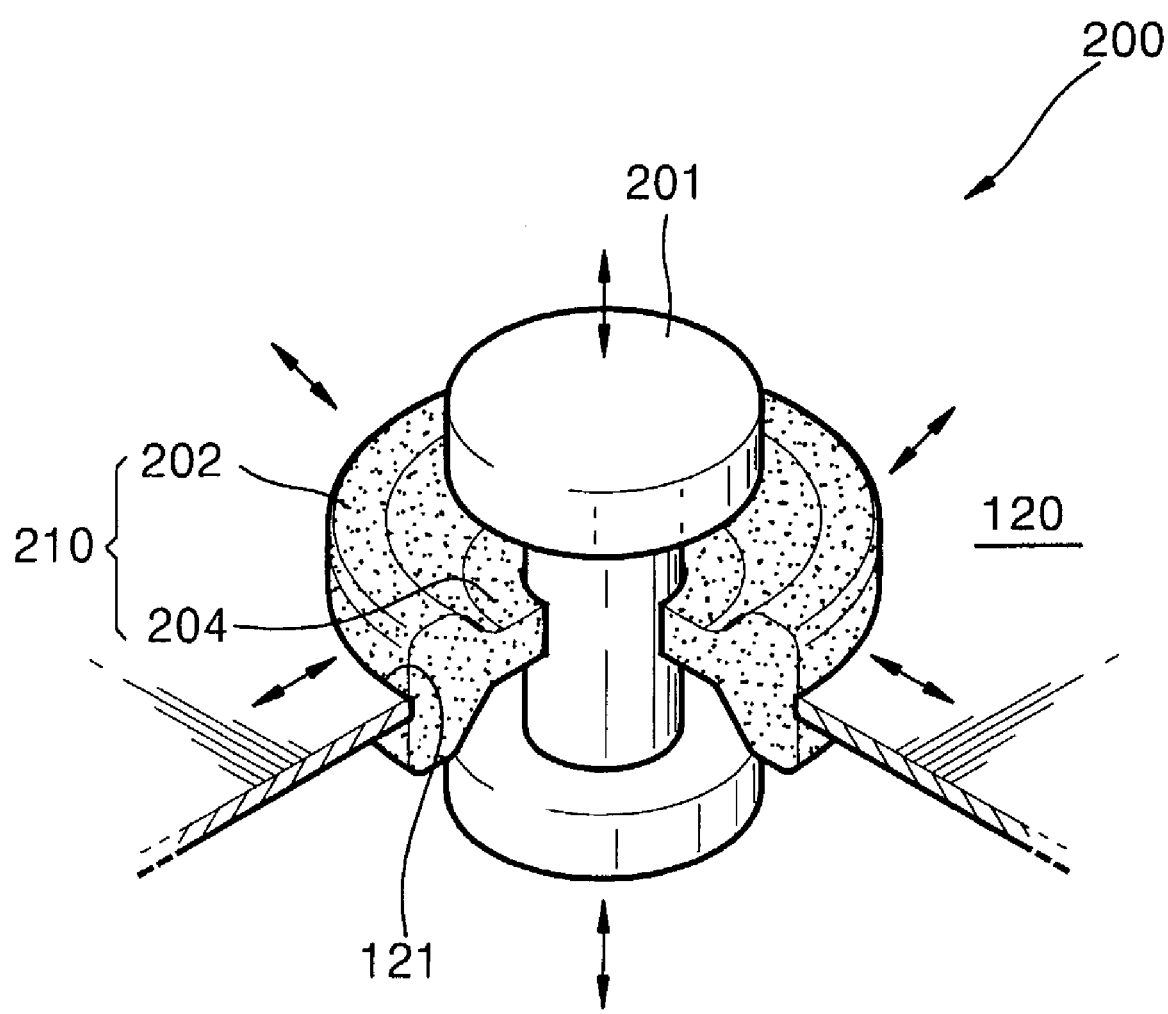
FIG. 6 is a perspective view illustrating another vibration absorber according to the present invention.

FIG. 6 shows another example of the vibration absorber. As shown in the drawing, a vibration absorber 200 includes a connection member 210, made of a rubber material exhibiting viscoelasticity, and a mass body 201. The connection member 210 includes a body 202 and an elastic portion 204.

The elastic portion 204 has an opening, in which the mass body 201 is inserted. The body 202 extends outwardly from the elastic portion 204 and is inserted in the penetration portion 121 of the frame 120. The body 202 is sized to be slightly larger than the penetration portion 121, and the connection member 210 is compressed when the connection member 210 is inserted in the penetration portion 121. According to one aspect, the elastic portion 204 is thinner than the body 202.

In this embodiment, when an exciting force is applied, the elastic portion 204 and/or the body 202 are viscoelastically deformed and recovered and the vibration of the mass body 201 is damped in a direction offsetting the exciting force.

Figure 7:
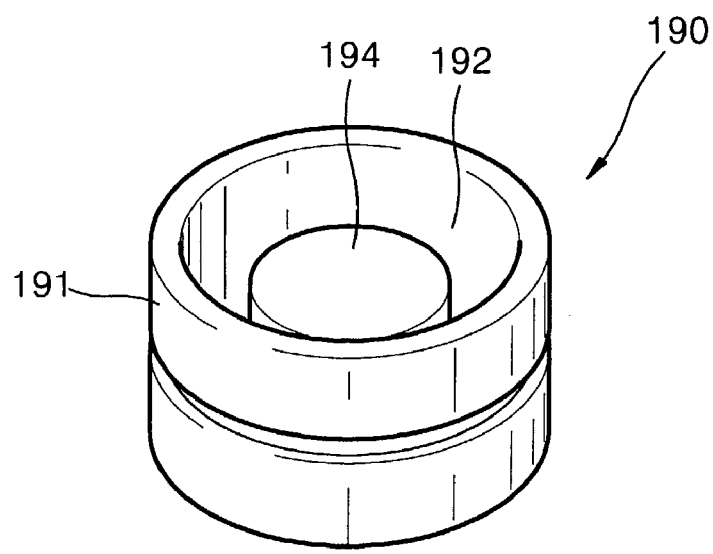
FIG. 7 is a perspective view illustrating yet another vibration absorber according to the present invention.
Figure 8:
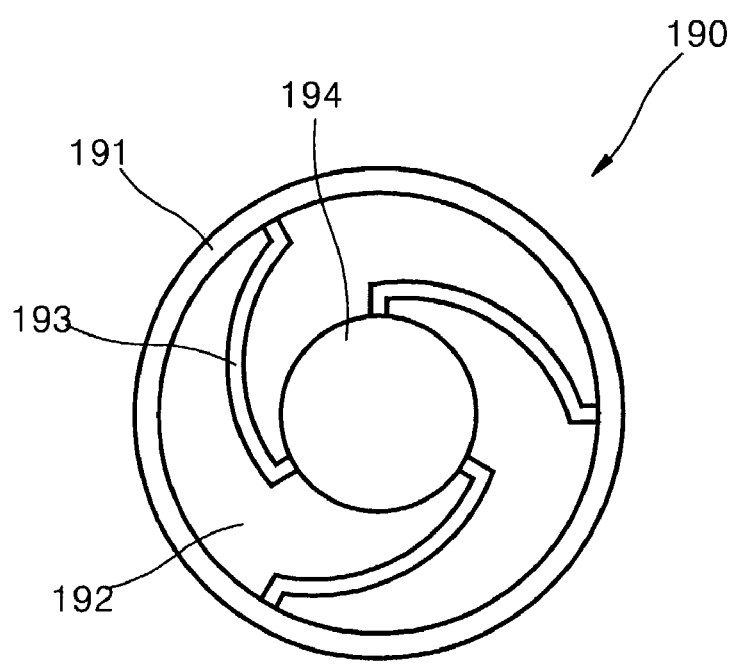
FIG. 8 is a plan view illustrating the vibration absorber of FIG. 7.

FIG. 7 shows another example of the vibration absorber. FIG. 8 is a plan view of the vibration absorber of FIG. 7.

As shown in FIGS. 7 and 8, a vibration absorber 190 according to the present preferred embodiment includes a body portion 191, a mass body 194, and elastic arms 193, which are integrally located. The body portion 191, having a cylindrical shape, has a hollow space portion 192, and is fixed to the frame 120. The mass body 194 is disposed in the hollow space portion 192.

According to one aspect, the body portion 191 and the mass body 194 are connected by three elastic arms 193. The elastic arms 193 extend from an outer circumferential surface of the mass body 194, and are connected to an inner circumferential surface of the body portion 191. As shown in FIG. 8, according to one aspect, the elastic arms 193 extend spirally with respect to the mass body 194. According to one aspect, the elastic arms are arrayed at regular intervals around the mass body 194. Here, the hollow space portion 192 is a space where the mass body 194 and the elastic arm 193 vibrate, and the diameter of the hollow space portion 192 is determined, considering the diameter of the mass body 194 and the space for the elastic arms 193.

According to one aspect, the mass body 194 and the body portion 191 are connected by at least four elastic arms.

According to one aspect, the vibration absorber 190 is manufactured by injection molding using plastic exhibiting elasticity. According to another aspect, the vibration absorber 190 is made of rubber.

The operation and effect according to the embodiments shown in FIGS. 5 through 8 are described below.

When the disk D having eccentric mass m' and a warp is placed on the turntable 140 and rotated, an exciting force in the horizontal direction is generated due to the eccentric mass m' and an exciting force in the vertical direction is generated due to the disk warp so that the frame 120 vibrates in the horizontal and vertical directions.

Figure 9:
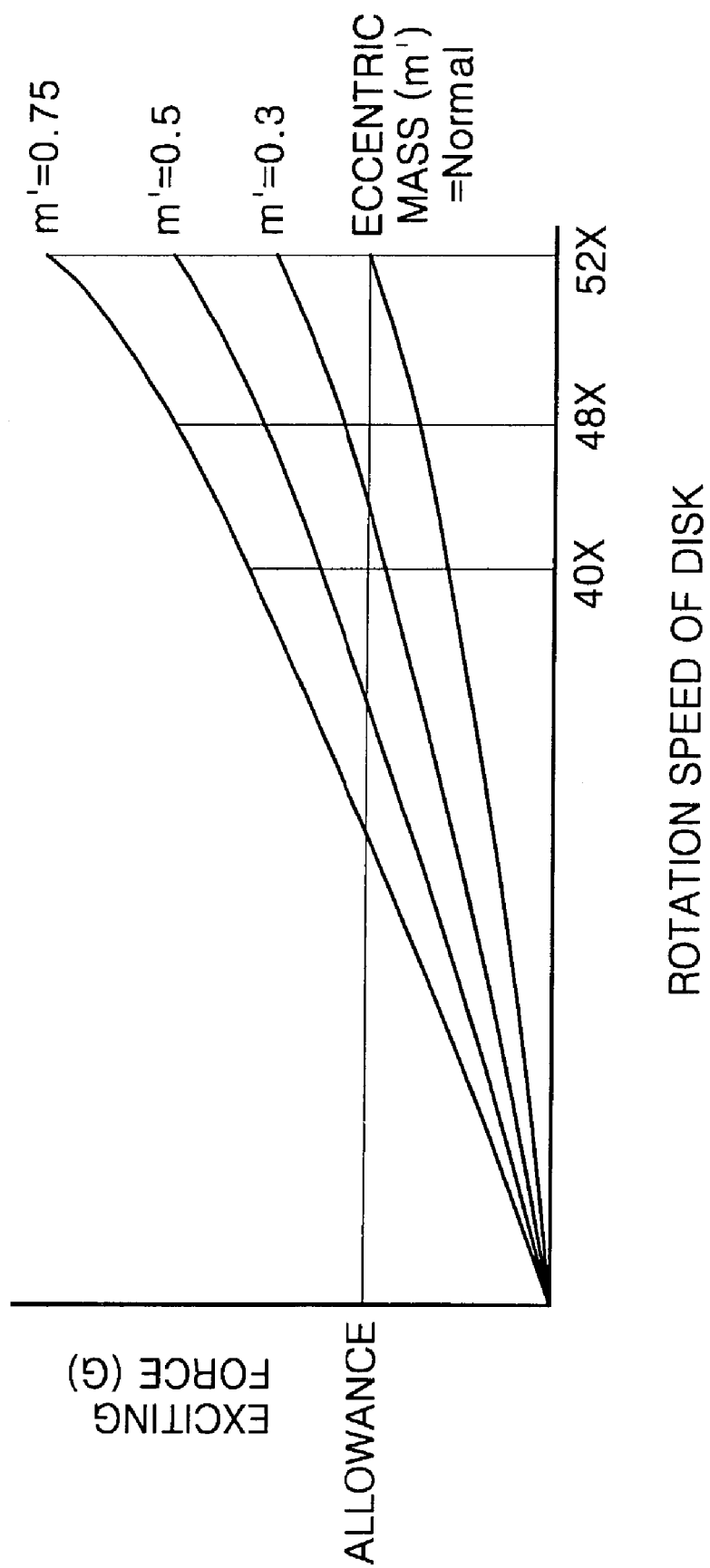
FIG. 9 is a graph showing the relationship between the rotation speed of a disk and the exciting force according to the amount of the eccentric mass of the disk.

FIG. 9 is a graph showing the relationship between the rotation speed of a disk and the exciting force according to the magnitude of the eccentric mass m' of the disk. As shown in the drawing, the amount of the exciting force increases in relation to the rotation speed of the disk D and the amount of the eccentric mass m' of the disk. When the exciting force is beyond an allowance level, since an error may occur in recording and reproduction of information, in general, stability is obtained by reducing the rotation speed of the disk D.

Figure 10:
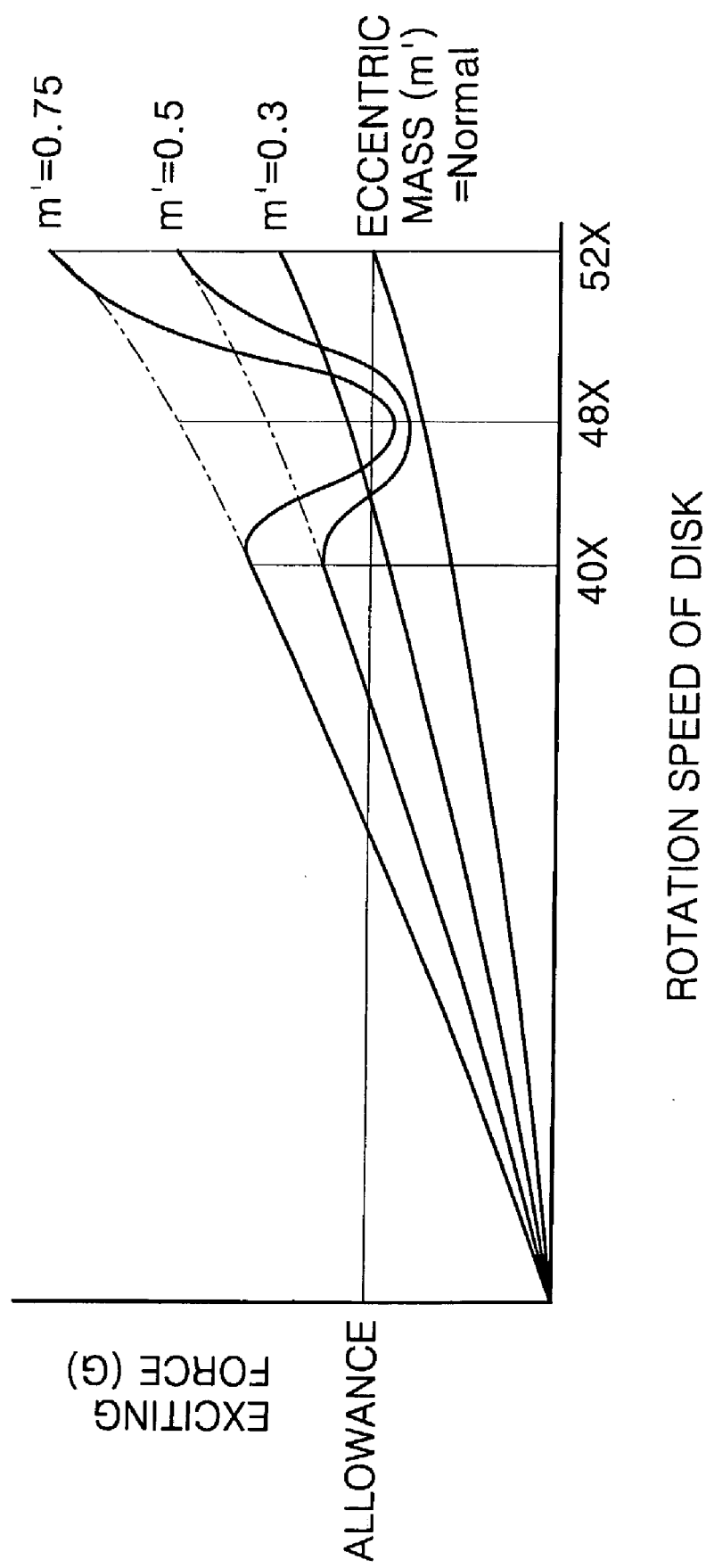
FIG. 10 is a graph showing a vibration absorption effect according to the vibration absorber adopted in the disk drive according to the present invention.

However, when the vibration absorber 180 shown in FIG. 5 is adopted, there is no need to reduce the rotation speed of the disk D. Since the natural frequency of the vibration absorber 180 depends on the mass M of the mass body 181 and the value of spring coefficient k, the vibration absorber 180 having a predetermined natural frequency can be obtained by changing the above factors. Thus, when the natural frequency of the vibration absorber 180 is set to be identical to the rotational frequency of the disk, the vibration of the frame 120 generated due to the eccentric mass m' is absorbed by the vibration of the mass body 181 of the vibration absorber 180, so that the vibration of the frame 120 can be drastically reduced. Thus, since the exciting force at a desired rotation speed can be reduced below the allowance, as shown in FIG. 10, by adjusting the mass M of the mass body 181 and the spring coefficient k of the coil spring 182, there is no need to reduce the rotation speed of the disk with regard to the vibration generated due to the eccentric mass m' of the disk. Such an effect is also obtained using the vibration absorbers 190 and 200 shown in FIGS. 6 through 8.

Further, when the vibration absorber 200 using the connection member 210 made of a rubber exhibiting viscoelasticity, as shown in FIG. 6, or the vibration absorber 190 made of viscoelastic rubber, as shown in FIG. 8, are used, a damping effect is additionally obtained. The damping effect does not affect the vibration frequency of the vibration absorber, unlike the mass M of the mass body or the spring coefficient k, but can reduce a displacement of vibration, to improve vibration and noise reduction performance of the vibration absorbers 190 and 200.

The operation described above regards reduction of to vibration in the horizontal direction generated by the eccentric mass m' of the disk. In addition, the vibration absorber also reduces vibration in the vertical direction generated by disk warp. As can be seen from the embodiments shown in FIGS. 4 through 8, the mass bodies of the vibration absorbers have structures that enable vibration not only in the horizontal direction but also in the vertical direction. Thus, the vibration absorber can absorb the vibration in the vertical direction generated due to a disk warp so that a stable interaction between the pickup unit and the recording surface of the disk is possible. Accordingly, increased disk capacity can be realized by increased speed of the disk drive and improvement in recording density.

The vibration absorber can be combined with the ball balancer shown in FIG. 3 in various ways to further reduce vibration.

According to one aspect, the ball balancer, which reduces the vibration due to the eccentric mass m' at a high speed, is installed in a disk drive for reproduction only used at high speed, e.g., over 60 hertz. The horizontal vibration due to the excess eccentric mass m' and the vertical vibration due to the disk warp, which cannot be overcome by the ball balancer, can be removed or reduced by installing the vibration absorber according to the present invention in which the natural frequency is set to correspond to a high speed. According to one aspect, a plurality of vibration absorbers absorbing vibrations at different frequencies are installed.

According to one aspect, the ball balancer and a plurality of vibration absorbers are installed together in a disk drive for recording and reproduction, to reduce vibrations at high speeds and at low speeds. That is, at least one vibration absorber absorbing vibration at low speeds, e.g., below 30 Hertz or below 40 Hertz, which cannot be reduced by the ball balancer, and at least one other vibration absorber absorbing vibration at high speeds and vibration due to disk warp, are installed. Thus, the vibrations at high and low speeds can be reduced. This is possible by variously changing the weight of the mass body, and the elastic coefficient of the connection member of the vibration absorbers.

According to another aspect, instead of the ball balancer, a plurality of vibration absorbers in which the weights of the mass bodies and the elastic coefficients of the connection members are different from one another can be installed to absorb vibrations in the vertical and horizontal directions at high and low speeds.

Although not shown in the drawings, according to one aspect, the vibration absorber is installed in a disk drive in which the frame where the spindle motor is installed is fixed, elevates with respect to the housing, and slides in and out of the housing.

As described above, the following effects can be obtained from the disk drive according to the present invention.

First, since the vibrations in the horizontal and vertical directions generated due to the eccentric mass and warp of a disk can be all absorbed, a disk drive which can stably perform recording and reproduction can be realized.

Second, through a variety of combinations with the ball balancer and a plurality of vibration absorbers absorbing vibrations having different frequencies, vibrations in the high speed and low speed areas can be effectively absorbed.

Third, by reducing noise due to vibration, an effective noise reduction effect can be obtained.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A disk drive comprising:
   a spindle motor rotating a disk;
   a pickup unit accessing the disk which rotates;
   a frame where the spindle motor is installed; and
   a vibration absorber absorbing vibrations in the frame due to rotation of the disk, and vibrating in a direction in which an exciting force is offset in horizontal and vertical directions with respect to the frame, the vibration absorber comprising
      a mass body having a circumferential surface, and
      a connection member that deforms elastically, and connects the mass body and the frame so that the mass body vibrates in the vertical and horizontal directions with respect to the frame, the connection member attached to the mass body at the circumferential surface.

2. The disk drive as claimed in claim 1, further comprising:
   at least one additional vibration absorber,
   wherein at least one of the plurality of vibration absorbers absorbs vibrations at a different frequency than at least one other of the plurality of vibration absorbers.

3. The disk drive as claimed in claim 1, further comprising:
   a rotation shaft of the spindle motor;
   a turntable, installed on the rotation shaft, and on which the disk is placed; and
   a ball balancer compensating for eccentric mass of the disk provided at the turntable.

4. The disk drive as claimed in claim 1, wherein the connection member comprises:
   a plurality of coil springs arranged at regular intervals around the mass body, and connecting the frame and the mass body.

5. A disk drive including a spindle motor rotating a disk, a pickup unit accessing the disk, and a frame where the spindle motor is installed, the disk drive comprising:
   a vibration absorber vibrating along a first axis and a second axis perpendicular to the first axis, to absorb vibrations in the frame generated by rotation of the disk, the vibration absorber comprising
      a mass body having a circumferential surface, and
      a connection member that deforms elastically, and connects the mass body and the frame so that the mass body vibrates in the vertical and horizontal directions with respect to the frame, the connection member attached to the mass body at the circumferential surface.

6. The disk drive according to claim 5, wherein:
   the disk drive comprises at least one additional vibration absorber;
   one of the plurality of vibration absorbers absorbs a vibration having a first frequency; and
   at least one other of the plurality of vibration absorbers absorbs a vibration having a second frequency,
   wherein the first and second frequencies are different.

7. The disk drive according to claim 5, wherein the connection member comprises:
   a plurality of elastic members arranged around the mass body, each elastic member having a first end connected to the mass body and a second end connected to the frame.

8. The disk drive according to claim 7, wherein:
   the plurality of elastic members are arranged at regular intervals.

9. The disk drive according to claim 7, wherein:
   the plurality of elastic members is a plurality of springs.

10. The disk drive according to claim 9, wherein:
    the plurality of springs is a plurality of coil springs.

11. The disk drive according to claim 5, further comprising:
    a housing,
    wherein the frame where the spindle motor is installed elevates with respect to the housing, and slides in and out of the housing.

12. A vibration absorber for a disk drive including a spindle motor rotating a disk, a, and a frame where the spindle motor is installed, the vibration absorber comprising:
    a mass body having a circumferential surface; and
    a connection member that elastically deforms, connected to the frame and the mass member so that the mass body vibrates along a first axis and a second axis that is perpendicular to the first axis, the connection member attached to the mass body at the circumferential surface.

13. A disk drive comprising:
    a spindle motor rotating a disk;
    a pickup unit accessing the disk which rotates;
    a frame where the spindle motor is installed; and
    a vibration absorbing means for absorbing vibrations in the frame due to rotation of the disk, and vibrating in a direction in which an exciting force is offset in horizontal and vertical directions with respect to the frame, the vibration absorbing means comprising
       a mass body having a circumferential surface, and
       a connection member that deforms elastically, and connects the mass body and the frame so that the mass body vibrates in the vertical and horizontal directions with respect to the frame, the connection member attached to the mass body at the circumferential surface.

14. The vibration absorber according to claim 13, wherein the mass body is cylindrical.

* * * * *